(12) United States Patent
Kishi et al.

(10) Patent No.: US 10,207,932 B2
(45) Date of Patent: Feb. 19, 2019

(54) TRICHLOROSILANE PURIFICATION SYSTEM AND METHOD FOR PRODUCING POLYCRYSTALLINE SILICON

(71) Applicant: Shin-Etsu Chemical Co., Ltd., Tokyo (JP)

(72) Inventors: Ryota Kishi, Niigata (JP); Masahiko Ishida, Niigata (JP); Shigeyoshi Netsu, Niigata (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/716,952

(22) Filed: Sep. 27, 2017

(65) Prior Publication Data

US 2018/0086645 A1    Mar. 29, 2018

(30) Foreign Application Priority Data

Sep. 28, 2016    (JP) .................... 2016-188944

(51) Int. Cl.
*C01B 33/107* (2006.01)
*B01D 3/14* (2006.01)

(52) U.S. Cl.
CPC .......... *C01B 33/10778* (2013.01); *B01D 3/14* (2013.01)

(58) Field of Classification Search
CPC ............... C01B 33/10778; B01D 3/14
See application file for complete search history.

(56) References Cited

U.S. PATENT DOCUMENTS

| 4,755,370 A * | 7/1988 | Kray ............. C01B 33/10778 423/341 |
| 2009/0060820 A1 | 3/2009 | Shimizu et al. |
| 2012/0058040 A1 | 3/2012 | Haeckl et al. |

FOREIGN PATENT DOCUMENTS

| DE | 1222481 B | 8/1966 | |
| EP | 3204134 A2 * | 8/2017 | ............. B01D 3/141 |
| JP | 2009-62212 A | 3/2009 | |
| JP | 2012-56836 A | 3/2012 | |

* cited by examiner

*Primary Examiner* — Timothy C Vanoy
(74) *Attorney, Agent, or Firm* — Westerman, Hattori, Daniels & Adrian, LLP

(57) ABSTRACT

There is provided trichlorosilane purification technology in which it is unnecessary to discharge large amounts of chlorosilanes oat of the system in the production of high-purity trichlorosilane from a chlorosilane fraction containing hydrocarbons and in which the reaction control can also be easily performed. In the present invention, the step of converting hydrocarbons contained in a chlorosilane fraction into low-boiling materials by thermal decomposition has been provided in the purification system in order to easily separate the hydrocarbons. Thereby, the conversion of hydrocarbons into low-boiling materials by thermal decomposition and the separation are performed in the trichlorosilane purification cycle, and it is unnecessary to discharge large amounts of chlorosilanes out of the system. As a result, the trichlorosilane production efficiency is increased, and the problem of yield reduction of polycrystalline silicon does not arise either.

8 Claims, 5 Drawing Sheets

TRICHLOROSILANE PURIFICATION SYSTEM AND METHOD FOR PRODUCING POLYCRYSTALLINE SILICON

BACKGROUND OF THE INVENTION

Field of the Invention

The present invention relates to trichlorosilane purification technology.

Description of the Related Art

Trichlorosilane is widely used as a raw material for producing semiconductor-grade high-purity polycrystalline silicon. High-purity trichlorosilane is obtained, for example, by purifying, through the steps such as distillation, crude trichlorosilane obtained by reacting metallurgical-grade metallic silicon with tetrachlorosilane, hydrogen, and hydrogen chloride.

Polycrystalline silicon is obtained by precipitating such high-purity trichlorosilane by a technique such as the Siemens method, but in this precipitation reaction, tetrachlorosilane is generated as a by-product. Such tetrachlorosilane as a by-product is reduced into trichlorosilane, which is then purified and can be utilized again in the precipitation reaction of polycrystalline silicon.

Cost reduction is required in the production of polycrystalline silicon, while further quality improvement is also required associated with the high integration of semiconductor devices and the like. Specifically, the concentration of impurities (such as carbon, dopants, and heavy metals) in polycrystalline silicon tends to be asked to be reduced to the limit. Therefore, high purification of trichlorosilane has extremely important significance in the production technology of polycrystalline silicon.

Most of the carbon impurities in trichlorosilane are impurity carbon contained in the metallic silicon used in the production of crude trichlorosilane described above and hydrocarbons by-produced from carbon contained in an inner wall material of a reactor and the like.

Therefore, it is necessary to remove such hydrocarbons in order to produce high-purity trichlorosilane. Generally, purification of trichlorosilane is performed by distillation. However, it is difficult to sufficiently remove hydrocarbons by distillation when the boiling points of hydrocarbons contained as impurities are close to the boiling point of trichlorosilane.

Particularly, the boiling points of hydrocarbons having 5 carbon atoms and hydrocarbons having carbon atoms in a number near 5 are extremely close to the boiling point of trichlorosilane. Therefore, it is the actual situation that separation of these substances by distillation is not easy. For example, the boiling point of isopentane (i-$C_5H_{12}$), a hydrocarbon which is a branched alkane having 5 carbon atoms, is 27.7° C. and is extremely close to the boiling point (31.8° C.) of trichlorosilane. Therefore, isopentane is one of the materials which are difficult to be separated by distillation.

In view of such circumstances, the following techniques have been proposed as the trichlorosilane purification technology.

Japanese Patent Laid-open No. 2009-062212 proposes a technique of making it easy to separate isopentane from trichlorosilane by distillation, by converting isopentane into a high-boiling material by photochlorination in a chlorination step.

Further, DE1222481B describes a method comprising introducing an off-gas (exhaust gas) from a first precipitation reactor into a second precipitation reactor to produce higher-purity polycrystalline silicon in the second precipitation reactor, and in this method, high-purity hydrogen is newly added to the second precipitation reactor for improving yield.

Furthermore, Japanese Patent Laid-Open No. 2012-056836 discloses a method for producing polycrystalline silicon comprising feeding purified condensate from a first precipitation process in a first reactor to a second reactor and using the condensate for a second precipitation process in the second reactor. In this method, hydrogen is circulated separately through the first reactor and through the second reactor, and unconsumed hydrogen is purified and used again.

However, there is a disadvantage in all of these methods that since the control and the like of the reaction is difficult and, in addition, large amounts of chlorosilanes are discharged out of the system during purification, the yield of polycrystalline silicon is reduced.

The present invention has been made in view of these problems, and an object of the present invention is to provide trichlorosilane purification technology in which it is unnecessary to discharge large amounts of chlorosilanes out of the system in the production of high-purity trichlorosilane from a chlorosilane fraction containing hydrocarbons and in which the reaction control can also be easily performed.

SUMMARY OF THE INVENTION

In order to solve the above problems, the trichlorosilane purification system according to the present invention is a system for obtaining high purity trichlorosilane from a chlorosilane fraction containing hydrocarbons, the system comprising: a thermal decomposition reactor for thermally decomposing the hydrocarbons in the chlorosilane fraction to convert the hydrocarbons into low-boiling materials; and a distiller for separating trichlorosilane contained in the chlorosilane fraction transferred from the thermal decomposition reactor from other components.

Preferably, the thermal decomposition reactor can convert at least isopentane, methyltrichlorosilane, and methyldichlorosilane into low-boiling materials.

Further, the thermal decomposition reactor can preferably control the pressure during the conversion of hydrocarbons into low-boiling materials in the range of 0.01 to 2 MPa.

Further, the thermal decomposition reactor can preferably control the temperature during the conversion of hydrocarbons into low-boiling materials in the range of 300 to 1200° C.

Further, the content of iron in an inner wall material of the thermal decomposition reactor is preferably 65% by weight or less, more preferably 50% by weight or less.

In an embodiment, the purification system comprises a gas line for introducing tetrachlorosilane and hydrogen into the thermal decomposition reactor.

Further, in an embodiment, the amount of hydrogen ($[H_2]$) introduced into the thermal decomposition reactor from the gas line can be controlled so that the ratio ($[H_2]/[STC]$) of the amount of hydrogen ($[H_2]$) to the amount of tetrachlorosilane ($[STC]$) will be in the range of 1 to 6.

Further, in an embodiment, the purification system further comprises: a hydrogenation reactor for reacting hydrogen with tetrachlorosilane in the presence of metallic silicon to obtain crude trichlorosilane; and a gas line for transferring the chlorosilanes containing hydrocarbons converted into low-boiling materials to the hydrogenation reactor.

In the trichlorosilane purification method according to the present invention, trichlorosilane is purified using the system described above.

Further, in the method for producing polycrystalline silicon according to the present invention, trichlorosilane purified in the system described above is used as a raw material.

Advantageous Effects of Invention

In the present invention, the step of converting hydrocarbons contained in a chlorosilane fraction into low-boiling materials by thermal decomposition has been provided in the purification system in order to easily separate the hydrocarbons. Thereby, the conversion of hydrocarbons into low-boiling materials by thermal decomposition and the separation are performed in the trichlorosilane purification cycle, and it is unnecessary to discharge a large amount of chlorosilanes out of the system. As a result, the trichlorosilane production efficiency is increased, and the problem of yield reduction of polycrystalline silicon does not arise, either.

DETAILED DESCRIPTION OF THE PREFERRED EMBODIMENTS

Figure 1A:
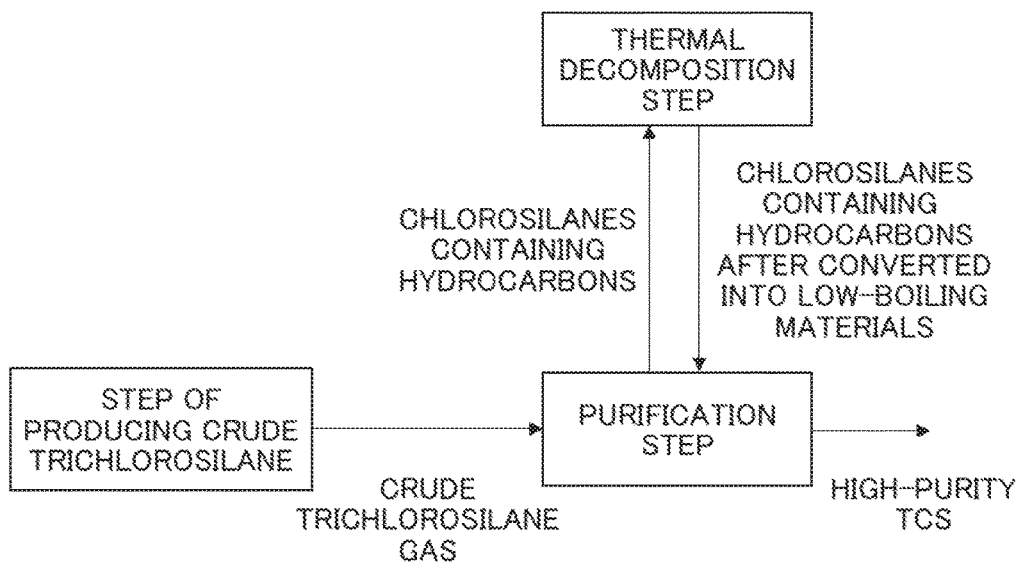
FIG. 1A is a block diagram of an example of a system in which crude trichlorosilane is distilled and purified to produce high-purity trichlorosilane.

Hereinafter, the trichlorosilane purification system according to the present invention will be described with reference to drawings.

Trichlorosilane (TCS) used for the production of polycrystalline silicon and the like is highly purified by distilling and purifying crude trichlorosilane obtained in a reaction accompanied by chlorination of metallic silicon, and the resulting high-purity trichlorosilane is fed to the step of producing polycrystalline silicon. Further, if high-purity trichlorosilane is separated by distilling and purifying a gas produced in the step of precipitating polycrystalline silicon, the high-purity trichlorosilane can be fed to the step of producing polycrystalline silicon again.

However, hydrocarbons by-produced from carbon impurities contained in metallic silicon used as a raw material are incorporated into the crude trichlorosilane as described above. Further, hydrocarbons by-produced from carbon contained in reactor materials and the like are incorporated into a gas produced in the step of precipitating polycrystalline silicon. Among such hydrocarbons, hydrocarbons having about 5 carbon atoms such as isopentane have boiling points close to that of trichlorosilane which is the target of purification, and the separation of these hydrocarbons from trichlorosilane is not easy. Particularly, the boiling point of isopentane is 27.7° C., which is extremely close to the boiling point of trichlorosilane of 31.8° C.

Thus, these hydrocarbons contained in crude trichlorosilane and in a gas produced in the step of precipitating polycrystalline silicon are gradually concentrated in the trichlorosilane purification process, even if the amounts of these hydrocarbons are very small. As a result, the hydrocarbons will be a hindrance in the high-purity purification of trichlorosilane.

In the present invention, hydrocarbons contained in chlorosilanes are converted to low-boiling materials by thermal decomposition to increase the boiling point difference with trichlorosilane. Thereby, the separation from trichlorosilane is made easy. Alkanes and alkenes each having 1-4 carbon atoms are obtained as a thermal decomposition product of hydrocarbons having 5 carbon atoms, and the boiling point of these thermal decomposition products are lower than that of trichlorosilane. The compound having the highest boiling point among these thermal decomposition products is cis-2-butene having 4 carbon atoms, and since the boiling point of cis-2-butene is 3.7° C., the boiling point difference (about 28° C.) between trichlorosilane and cis-2-butene is sufficiently large from the point of view of separation. Therefore, the present invention aims to convert hydrocarbons contained in chlorosilanes into low-boiling hydrocarbons having 4 or less carbon atoms by thermal decomposition. Thereby, the boiling point difference can be about 28° C. described above or more.

Thus, the trichlorosilane purification system according to the present invention makes it possible to obtain high-purity trichlorosilane from a chlorosilane fraction containing hydrocarbons by providing a thermal decomposition reactor for thermally decomposing hydrocarbons in a chlorosilane fraction to convert the hydrocarbons into low-boiling materials and a distiller for separating trichlorosilane contained in the chlorosilane fraction transferred from the thermal decomposition reactor from other components.

Figure 1B:
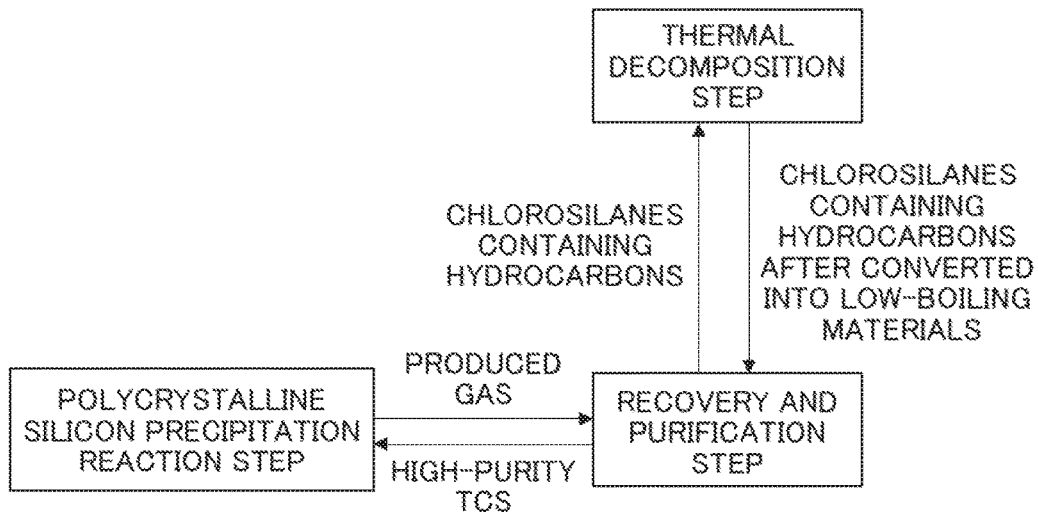
FIG. 1B is a block diagram of an example of a system in which a gas produced in the step of precipitating polycrystalline silicon is distilled and purified to separate high-purity trichlorosilane, and the resulting high-purity trichlorosilane is fed to the step of producing polycrystalline silicon again.

FIG. 1A is a block diagram of an example of a system in which crude trichlorosilane is distilled and purified to produce high-purity trichlorosilane, and FIG. 1B is a block diagram of an example of a system in which a gas produced in the step of precipitating polycrystalline silicon is distilled and purified to separate high-purity trichlorosilane and the resulting high-purity trichlorosilane is fed to the step of producing polycrystalline silicon again.

Chlorosilanes containing hydrocarbons (for example, isopentane, methyltrichlorosilane, and methyldichlorosilane) are fed to the thermal decomposition step (thermal decomposition reactor), and the hydrocarbons are thermally decomposed in the reactor heated to 300° C. to 1200° C. and converted into low-boiling materials. Then, the chlorosilane fraction containing the hydrocarbons converted into low-boiling materials is transferred to the purification step (distiller), and trichlorosilane is separated from other components.

As described above, hydrocarbons having boiling points close to that of trichiorosilane are easily separated from trichiorosilane since the hydrocarbons are converted into low-boiling materials by passing them through the thermal decomposition step, and a high-purity trichiorosilane will be easily formed.

It is preferred that the thermal decomposition reactor used in the present invention can convert at least isopentane, methyltrichlorosilane, and methyldichlorosilane into low-boiling materials. That is because these hydrocarbons have boiling points close to that of trichiorosilane which is the target of purification, and separation of trichiorosilane from these hydrocarbons is not easy by a common technique.

Further, since the thermal decomposition described above is performed, for example, in the pressure range of 0.01 to 2 MPa in the temperature range of in a 300 to 1200° C., it is preferred that the thermal decomposition reactor can control the pressure during the conversion of hydrocarbons into low-boiling materials in the range of 0.01 to 2 MPa.

Figure 2:
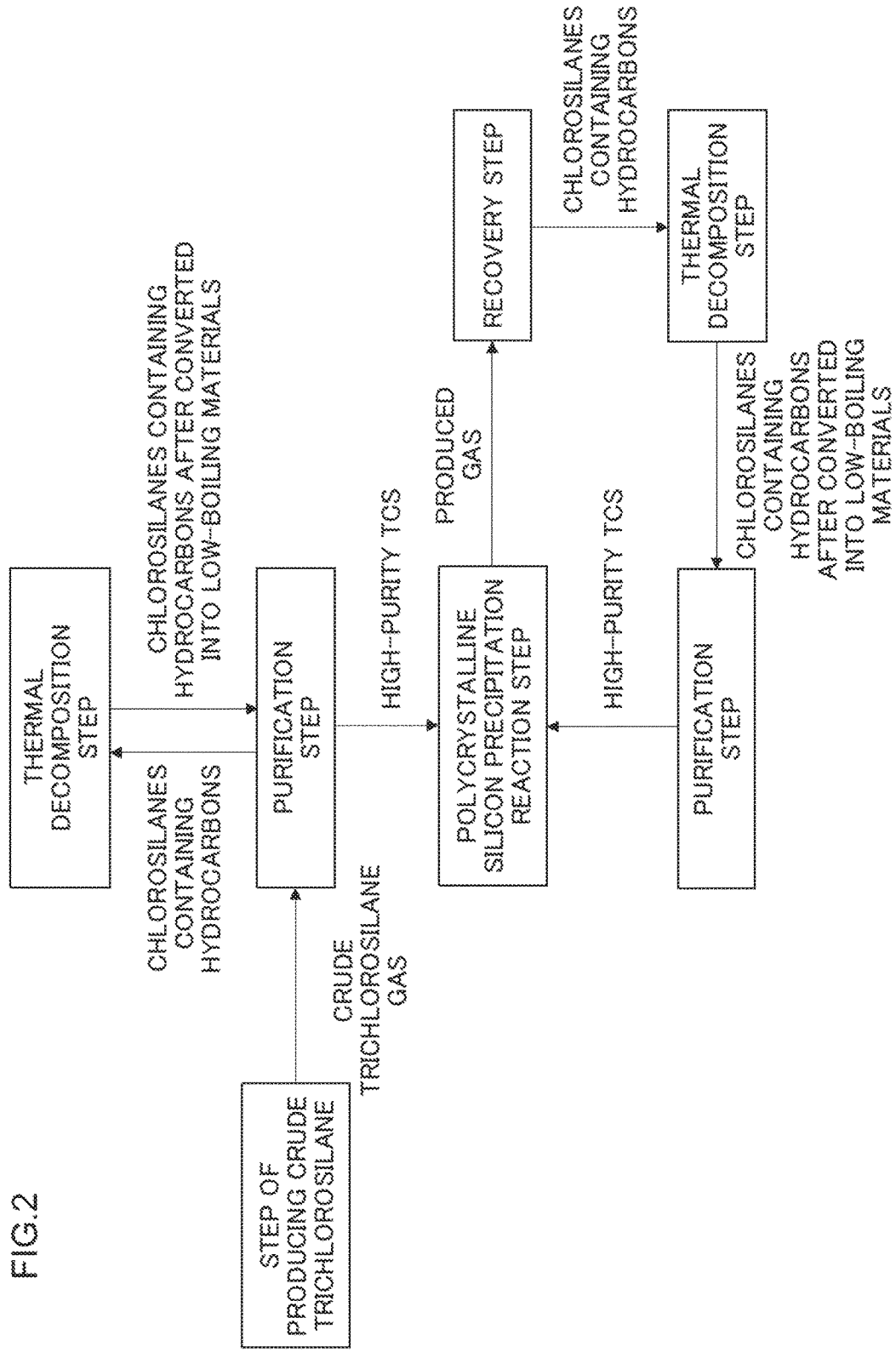
FIG. 2 is a block diagram of an example of a system in which a gas fed from the step of producing crude trichlorosilane is purified, and the purified gas is used as a gas for producing polycrystalline silicon as high-purity trichlorosilane; and a gas discharged from the step of precipitating polycrystalline silicon is purified, and the purified gas is fed and used in the step of precipitating polycrystalline silicon again.

FIG. 2 is a block diagram of an example of a circulation system in which the steps shown in FIG. 1A and FIG. 1B are combined; a gas fed from the step of producing crude trichlorosilane is purified, and the purified gas is used as a gas for producing polycrystalline silicon as high-purity trichlorosilane; and a gas discharged from the step of precipitating polycrystalline silicon is purified, and the purified gas is fed and used in the step of precipitating polycrystalline silicon again.

Figure 3:
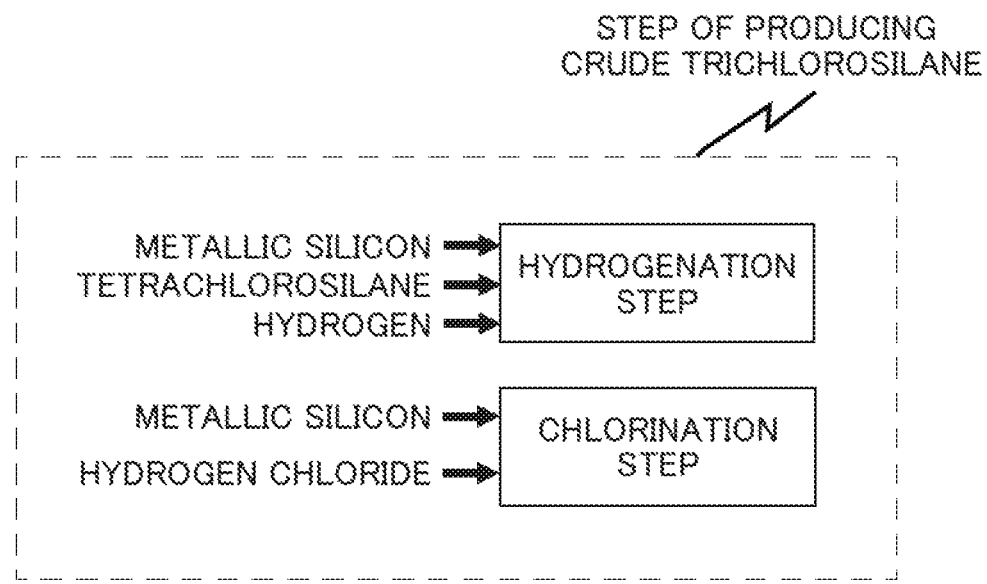
FIG. 3 is a block diagram for describing an embodiment in which the step of producing crude trichlorosilane comprises at least one of a hydrogenation step and a chlorination step.

Note that the step of producing crude trichlorosilane shown in FIG. 2 may comprise only one of the hydrogenation step (hydrogenation reactor) and the chlorination step (chlorination reactor) or may comprise both of the steps, as in the embodiment shown in FIG. 3. In this case, in the hydrogenation step, metallic silicon, tetrachlorosilane, and hydrogen are fed; hydrogen is reacted with tetrachlorosilane in the presence of metallic silicon to obtain crude trichlorosilane containing trichlorosilane; and there is provided a gas line for transferring the crude trichlorosilane to the thermal decomposition reactor. Further, in the chlorination step, metallic silicon and hydrogen chloride are fed, and crude trichlorosilane containing trichlorosilane is obtained.

Figure 4:
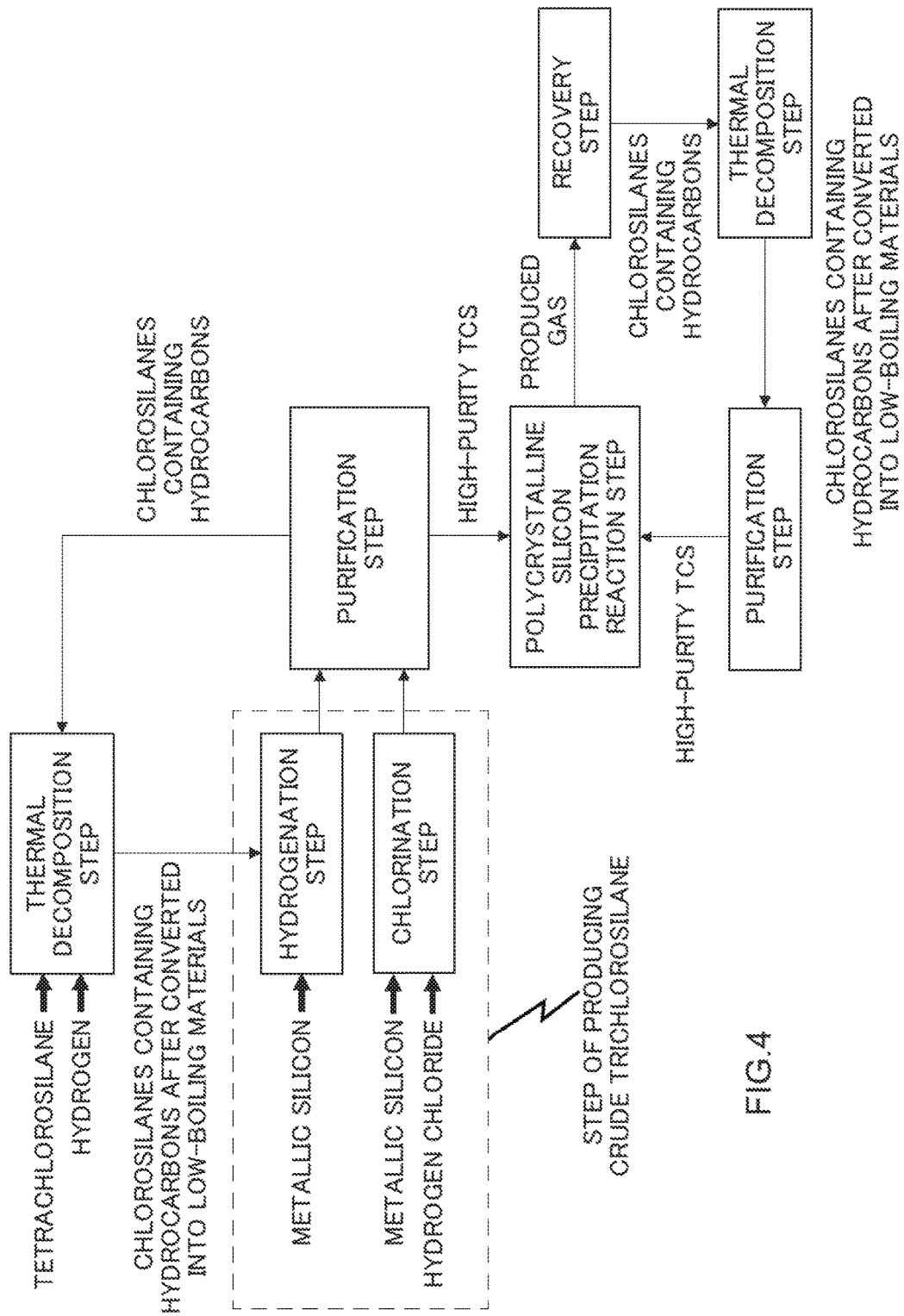
FIG. 4 is a block diagram for describing an embodiment in which a chlorosilane fraction containing hydrocarbons separated by the purification of crude trichlorosilane is fed to a thermal decomposition step together with tetrachlorosilane and hydrogen, and the resulting chlorosilanes containing thermally-decomposed hydrocarbons are fed to a hydrogenation step in the step of producing crude trichlorosilane.

Further, as in the embodiment shown in FIG. 4, there may be an embodiment in which a gas line for introducing tetrachlorosilane and hydrogen into a thermal decomposition reactor; a chlorosilane fraction containing hydrocarbons separated by the purification of crude trichlorosilane is fed to the thermal decomposition step together with tetrachlorosilane and hydrogen; and the resulting chlorosilanes containing thermally-decomposed hydrocarbons are fed to a hydrogenation step in the step of producing crude trichlorosilane. Note that, in this case, it is preferred that the amount of hydrogen ($[H_2]$) introduced into the thermal decomposition reactor from the gas line described above can be controlled so that the ratio ($[H_2]/[STC]$) of the amount of hydrogen ($[H_2]$) to the amount of tetrachlorosilane ($[STC]$) will be in the range of 1 to 6.

Figure 5:
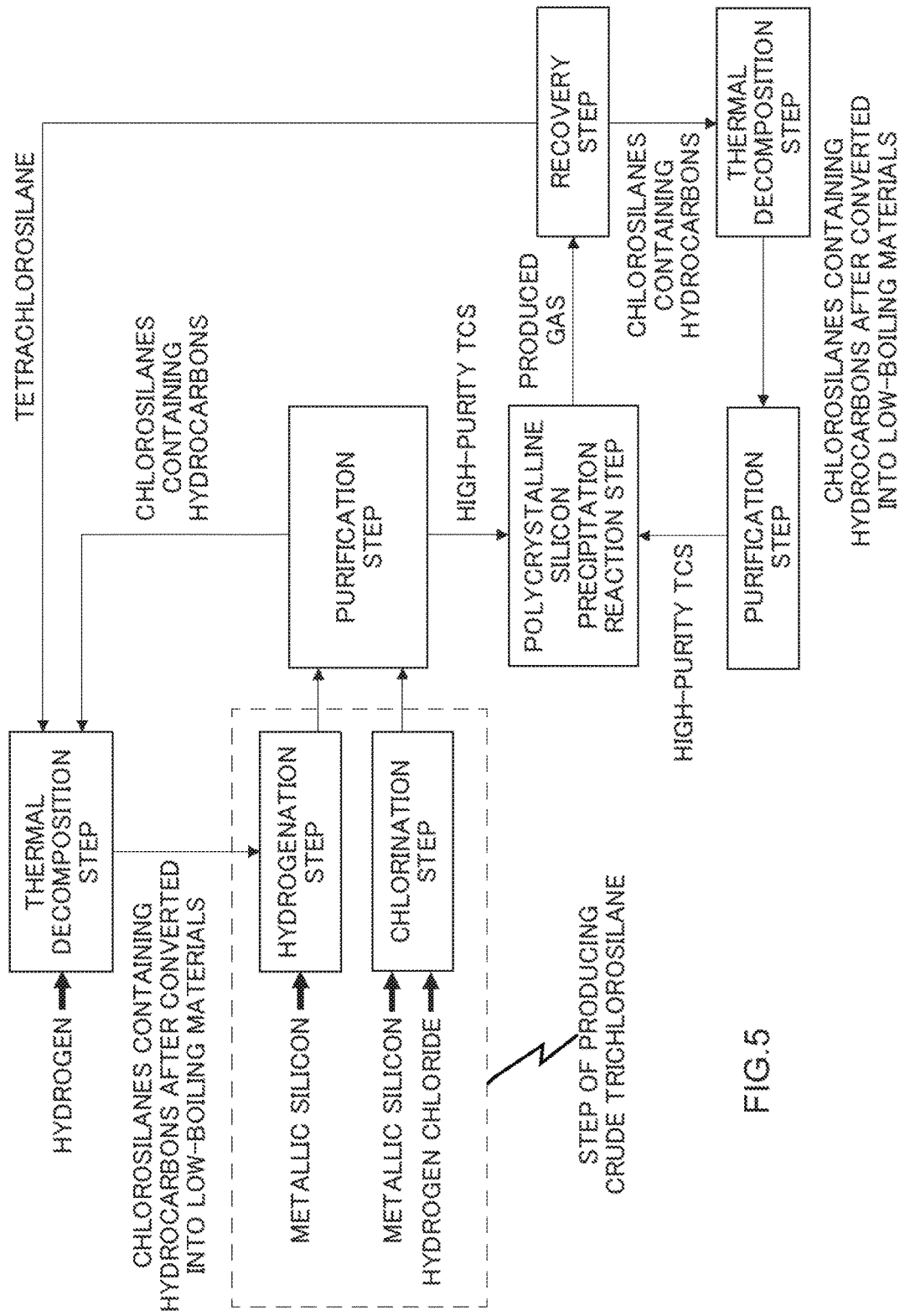
FIG. 5 is a block diagram for describing an embodiment in which tetrachlorosilane recovered after a polycrystalline silicon precipitation reaction is fed to a hydrogenation step through a thermal decomposition step.

Furthermore, as in the embodiment shown in FIG. 5, there may be an embodiment in which tetrachlorosilane recovered after a polycrystalline silicon precipitation reaction is fed to a hydrogenation step through a thermal decomposition step. Note that, also in this case, it is preferred that the amount of hydrogen ($[H_2]$) introduced into the thermal decomposition reactor from the gas line described above can be controlled so that the ratio ($[H_2]/[STC]$) of the amount of hydrogen ($[H_2]$) to the amount of tetrachlorosilane ($[STC]$) will be in the range of 1 to 6.

EXAMPLES

Hereinafter, in Examples and Comparative Examples, there will be shown specific examples of converting isopentane in a test gas into low-boiling materials by thermal decomposition by the system of the present invention, the test gas being obtained by adding isopentane as a hydrocarbon to a mixed gas of tetrachlorosilane and hydrogen at a predetermined concentration.

Example 1

A test gas (tetrachlorosilane:hydrogen=1:6) to which isopentane was added at a concentration of 5 ppm was passed through a quartz tube under a thermal decomposition temperature condition of 450 to 650° C., and the isopentane concentration in the discharged gas was measured by gas chromatography (FID-GC) using a flame ionization detector to determine the percent decomposition of isopentane.

Example 2

A test gas (tetrachlorosilane:hydrogen=1:6) to which isopentane was added at a concentration of 5 ppm was passed through a quartz tube whose inner wall was covered with pure nickel under a thermal decomposition temperature condition of 450 to 650° C., and the isopentane concentration in the discharged gas was measured by FID-GC to determine the percent decomposition of isopentane.

Example 3

A test gas (tetrachlorosilane:hydrogen=1:6) to which isopentane was added at a concentration of 5 ppm was passed through a quartz tube whose inner wall was covered with SUS316 under a thermal decomposition temperature condition of 450 to 650° C., and the isopentane concentration in the discharged gas was measured by FID-GC to determine the percent decomposition of isopentane.

Example 4

A test gas (tetrachlorosilane:hydrogen=1:6) to which isopentane was added at a concentration of 5 ppm was passed through a quartz tube whose inner wall was covered with pure iron under a thermal decomposition temperature condition of 450 to 650° C., and the isopentane concentration in the discharged gas was measured by FID-GC to determine the percent decomposition of isopentane.

Comparative Example 1

A test gas (tetrachlorosilane:hydrogen=1:6) to which isopentane was added at a concentration of 5 ppm was passed through a quartz tube under a thermal decomposition temperature of room temperature, and the isopentane concentration in the discharged gas was measured by FD-GC to determine the percent decomposition of isopentane.

Comparative Example 2

A test gas (tetrachlorosilane:hydrogen=1:6) to which isopentane was added at a concentration of 5 ppm was passed through a quartz tube whose inner wall was covered with SUS316 under a thermal decomposition temperature of room temperature, and the isopentane concentration in the discharged gas was measured by FID-GC to determine the percent decomposition of isopentane.

The results of Examples 1 to 4 and Comparative Examples 1 to 2 were summarized in Table 1.

TABLE 1

| | Reactor inner wall material | Room temperature | Percent decomposition of i-$C_5H_{12}$ at each temperature (%) | | | |
|---|---|---|---|---|---|---|
| | | | 450° C. | 530° C. | 600° C. | 650° C. |
| Example 1 | Quartz | — | 68 | 82 | 85 | 91 |
| Example 2 | Nickel | — | 66 | 80 | 84 | 90 |
| Example 3 | SUS316 | — | 47 | 68 | 72 | 90 |
| Example 4 | Iron | — | 43 | 59 | 73 | 91 |
| Comparative Example 1 | Quartz | 0 | — | — | — | — |
| Comparative Example 2 | SUS316 | 0 | — | — | — | — |

According to the results shown in Table 1, it can be verified that the thermal decomposition of isopentane in chlorosilanes is accelerated with the increase of temperature. Further, it can be verified that the thermal decomposition is easily accelerated with the decrease of iron content in the material of the reactor inner wall surface. Since iron content in SUS316 is about 65% by weight or less, the results shown in Table 1 at least show that the improvement effect of the percent decomposition of i-$C_5H_{12}$ is observed when iron content in the inner wall material of the thermal decomposition reactor is 65% by weight or less. Examples of such material include Incoloy (R) 800H, whose iron content is about 45% by weight. When the present inventors performed an experiment in a thermal decomposition reactor using Incoloy (R) 800H as the inner wall material, an improvement in the percent decomposition at 650° C. was observed compared with the results in a thermal decomposition reactor using pare iron or SUS316 as the inner wall material. Consequently, in practical use, it is conceivable that an inner wall material having an iron content of 65% or less will preferably be used, and more preferably, an inner wall material having an iron content of 50% by weight or less will be used.

High-purity trichlorosilane is produced using the system described above, and polycrystalline silicon is produced using the high-purity trichlorosilane as a raw material.

INDUSTRIAL APPLICABILITY

The present invention provides trichlorosilane purification technology in which it is unnecessary to discharge large amounts of chlorosilanes out of the system in the production of high-purity trichlorosilane from a chlorosilane fraction containing hydrocarbons and in which the reaction control can also be easily performed.

What is claimed is:

1. A trichlorosilane purification system for obtaining semiconductor-grade trichlorosilane from a chlorosilane fraction comprising hydrocarbons, the system comprising:
a thermal decomposition reactor for thermally decomposing the hydrocarbons in the chlorosilane fraction to convert the hydrocarbons into materials having a lower boiling point than that of the hydrocarbons; and
a distiller for separating trichlorosilane comprised in the chlorosilane fraction transferred from the thermal decomposition reactor from other components, wherein the thermal decomposition reactor can convert at least isopentane, methyltrichlorosilane, and methyldichlorosilane into low-boiling materials.

2. The trichlorosilane purification system according to claim 1, wherein the thermal decomposition reactor can control the pressure during the conversion of hydrocarbons into low-boiling materials in the range of 0.01 to 2 MPa.

3. The trichlorosilane purification system according to claim 1, wherein the thermal decomposition reactor can control the temperature during the conversion of hydrocarbons into low-boiling materials in the range of 300 to 1200° C.

4. The trichlorosilane purification system according to claim 1, wherein the content of iron in an inner wall material of the thermal decomposition reactor is 65% by weight or less.

5. The trichlorosilane purification system according to claim 4, wherein the content of iron in the inner wall material of the thermal decomposition reactor is 50% by weight or less.

6. The trichlorosilane purification system according to claim 1, wherein the purification system comprises a gas line for introducing tetrachlorosilane and hydrogen into the thermal decomposition reactor.

7. The trichlorosilane purification system according to claim 6, wherein the amount of hydrogen ([$H_2$]) introduced into the thermal decomposition reactor from the gas line can be controlled so that the ratio ([$H_2$]/[STC]) of the amount of hydrogen ([$H_2$]) to the amount of tetrachlorosilane ([STC]) will be in the range of 1 to 6.

8. The trichlorosilane purification system according to claim 1, wherein the purification system further comprises:
a hydrogenation reactor for reacting hydrogen with tetrachlorosilane in the presence of metallic silicon to obtain crude trichlorosilane; and a gas line for transferring the chlorosilanes comprising hydrocarbons converted into low-boiling materials to the hydrogenation reactor.

* * * * *